United States Patent [19]

Downing et al.

[11] 4,070,199

[45] Jan. 24, 1978

[54] CEMENTITIOUS COMPOSITIONS

[75] Inventors: Stephen Barry Downing, High Wycombe; Desmond Wilfred John Osmond, Windsor; Maurice Wainwright Skinner, Maidenhead; Edmund James West; David George Dawson, both of High Wycombe, all of England

[73] Assignee: Imperial Chemical Industries Limited, London, England

[21] Appl. No.: 736,350

[22] Filed: Oct. 27, 1976

[30] Foreign Application Priority Data

Oct. 28, 1975 United Kingdom ............ 44369/75

[51] Int. Cl.$^2$ .................................................. C04B 7/353
[52] U.S. Cl. ........................................ 106/93; 106/99; 260/29.6 S; 260/42.13
[58] Field of Search ............ 106/93, 99; 260/29.6 S, 260/42.13

[56] References Cited

U.S. PATENT DOCUMENTS

| 3,030,258 | 4/1962 | Wagner | 106/93 |
|---|---|---|---|
| 3,169,877 | 2/1965 | Bartoli et al. | 106/93 |
| 3,215,549 | 11/1965 | Ericson | 106/93 |
| 3,243,307 | 3/1966 | Selden | 106/93 |
| 3,483,007 | 12/1969 | Hook | 106/93 |
| 3,716,386 | 2/1973 | Kempster | 106/93 |
| 3,762,937 | 10/1973 | Schupack | 106/93 |
| 3,788,869 | 1/1974 | Batdorf et al. | 106/93 |
| 3,824,107 | 7/1974 | Weiant | 106/93 |

Primary Examiner—J. Poer
Attorney, Agent, or Firm—Cushman, Darby & Cushman

[57] ABSTRACT

Cured cementitious compositions having a modulus of rupture of greater than 15 MN/m$^2$ are prepared by curing and drying a homogeneous uncured cementitious composition which comprises in defined proportions hydraulic cement, water and a selected water-dispersible polymer.

32 Claims, No Drawings

CEMENTITIOUS COMPOSITIONS

This invention relates to homogeneous uncured cementitious compositions which when cured and dried yield cured compositions of high strength; to cured cementitious compositions of high strength; to methods of producing homogeneous uncured cementitious compositions and methods of producing cured compositions of high strength; and to shaped articles which comprise a cured composition of high strength.

Hydraulic cements are conventionally used to prepare cementitious products, e.g. concrete, which have relatively high and consistent compressive strengths, typically of the order 70 – 100 MN/m$^2$. However, these products have had relatively poor and unreliable tensile strength and modulus of rupture, the latter being typically about 5 MN/m$^2$. These strength characteristics have hitherto precluded the use of cementitious compositions in situations where significant bending loads must be borne except where the compositions have been internally reinforced with materials of higher strength. Thus, in the past, the major uses of cementitious compositions have been those where the high compressive strength has been utilised and where any improvement of the compressive strength has not given any corresponding useful improvement in the tensile strength or modulus of rupture.

It is known that several factors control the ultimate value of the compressive strength of cementitious compositions. These factors include density and degree of compaction, the ratio of water to cement and the conditions of temperature and humidity during the curing of the chemical constituents of the hydraulic cement. The density and degree of compaction are, however, strongly dependent on the amount of water used in the preparation of the uncured cementitious composition. Conventionally, an amount of water in excess of that required to form the fully hydrated composition is used simply to enable easy handling of the composition, but when the composition is caused to cure, this excess water must be evaporated. The evaporation of this water inevitably leaves voids in the cured composition which may behave as points of weakness when the material is subjected to stress. The phenomena of failure in flexure and compression have been extensively studied by many workers and it is now believed that voids and imperfections of the type just described cause the stresses in the material to be concentrated locally on a molecular scale in such magnitude that the ultimate tensile strength of the material is exceeded and fracture occurs. It is known that the compressive strength of cementitious compositions can be significantly improved by reducing the quantity of water which is used in the preparation of these compositions. However, the use of small quantities of water inevitably requires the use of unconventional, difficult or inconvenient means of processing or forming the material; for example the use of very high compacting pressures to press either the water-cement mix or the dry cement powder prior to hydration; and such processes are impracticable on a large scale.

It is also known to use certain organic materials which modify the rheology of the cementitious composition so as to render it more easy to handle and/or to allow the use of smaller quantities of water without loss of this advantage. One class of such materials, conveniently termed "dispersing agents" but also known in the art as "plasticisers", "superplasticisers" or "water reducing aids", is that comprising agents such as sulphonated synthetic resins and sulphonated natural polymers from wood pulp processing. These agents alter the rheology of the composition by improving the dispersion of the hydraulic cement particles in the water and thus allow the quantity of water used to be reduced. But there is a limited amount of such dispersing agents which can be employed beyond which no further benefit in terms of improved workability is obtained. In some cases, adverse effects on the ultimate strength may be found at higher levels of these agents. Another class of "dispersing agent" is the group of water-dispersible polymers whose solutions in water have viscosities much greater than the viscosity of water. These materials have previously been used to modify the rheology of certain fibre-containing cementitious compositions, since addition of fibres in quantities suitable for reinforcement, generally adversely affects the rheology of cementitious compositions. In general the aim has been to alter the rheology of the compositions to render them more suitable for processing by a particular method, e.g. by extrusion or compression moulding. At the same time, however, the use of fibre in quantities suitable for reinforcement has usually necessitated the use of such quantities of water that the modulus of rupture of the 'matrix' of the cured composition i.e. the limit of direct proportionality in the stress-strain relationship with respect to the 'matrix' in which the fibres have been embedded has inevitably been low. Nevertheless, the modulus of rupture of the total fibre-reinforced composition could, have been high.

We have now found that certain cured cementitious compositions can be produced, from ingredients comprising essentially hydraulic cement, water and selected "dispersing agents" (hereinafter termed water-dispersible polymer), which have a surprisingly high modulus of rupture. The modulus of rupture of these compositions coincides with the limit of proportionality in the stress/strain relationship for such compositions.

We have also found that certain types and proportions of fibre may also be present in these cementitious compositions of high modulus of rupture. Preferably these fibres are present in such proportion that they do not significantly increase the modulus of rupture but that they do improve such strength properties as impact resistance. Nevertheless there may be present in the compositions of this invention such a proportion of fibres of high tensile strength, for example glass fibre, that the modulus of rupture is increased. However, inorganic mineral fibre, notably asbestos fibre, should not be present in a proportion of greater than 1% by weight of the fibre based on the combined weight of the initial ingredients, and the invention is limited to a maximum of 1% of such inorganic mineral fibre if present at all. Preferably, the inorganic mineral fibre is completely absent in view of the hazard to health.

According to the invention we provide a homogeneous uncured cementitious composition which comprises the ingredients a. a hydraulic cement as herein defined,
b. water, and
c. a water-dispersible polymer as herein defined, wherein -
 i. the ratio of water to hydraulic cement is in the range 15 – 28 parts by weight of water to 100 parts by weight of hydraulic cement;

ii. the ratio of water-dispersible polymer to hydraulic cement is in the range 0.1 – 3.0 parts by weight of water-dispersible polymer to 100 parts by weight of hydraulic cement;

iii. the water-dispersible polymer is selected with reference to the hydraulic cement and to the selected proportions of polymer and water for its suitability to facilitate homogenisation as herein defined and to yield on homogenisation a product which can be shaped under pressure and which is shape-retaining and wherein the ingredients (a), (b) and (c) have been jointly subjected to a homogenisation process (as herein defined) and, optionally, have been shaped, such that on curing and drying, the homogeneous uncured composition yields a cured, dried and optionally shaped cementitious material having a modulus of rupture greater than 15 MN/m².

Preferably the water-dispersible polymer is further selected with reference to the hydraulic cement by a test as herein described which demonstrates a significant prolongation of the time which is required by a mixture of water-dispersible polymer, hydraulic cement, and water in defined weight proportions to reach a maximum rate of heat evolution compared with the time which is required to reach a mixture rate of heat evolution by a mixture of hydraulic cement and water alone in the same weight proportions. In general such selected polymer will provide a cured and dried composition having modulus of rupture of greater than 20 MN/m².

According to a further aspect of the invention, we provide a method of producing a homogeneous uncured cementitious composition which when cured and dried yields a cured cementitious material having a modulus of rupture greater than 15 MN/m², which comprises subjecting to a homogenisation process (as herein defined) ingredients (a), (b) and (c) as defined above.

According to a further aspect of the invention, we provide a method of producing a cured and dried cementitious composition having a modulus of rupture greater than 15 MN/m² which comprises curing and drying a homogeneous cementitious composition as defined above.

According to another aspect of the invention we provide a cured and dried cementitious composition comprising cured hydraulic cement and a water-dispersible polymer as herein defined which has a modulus of rupture of greater than 15 MN/m².

Preferably the homogeneous uncured cementitious composition defined above is one which on curing and drying provides a cured composition having a modulus of rupture of greater than 20 MN/m². and more preferably a modulus of rupture of greater than 30 MN/m².

The invention also provides shaped articles which comprise a cured and dried cementitious composition as defined above.

By the term modulus of rupture of a material (sometimes termed the flexural strength) we mean the maximum tensile stress which can be tolerated before failure in a sample of the material which is subjected to bending, as calculated on the basis of the Euler-Bernoulli theory of bending. In the Examples of the present specification the modulus of rupture of the cementitious compositions was determined after curing under conditions which take into account the factors known to maximise strength properties.

A suitable sample of the material was deformed to the point of rupture in a three-point bending test using a tensometer, e.g. an Instron tensometer. In this test the samples had a span to depth ratio of not less than 10 to 1. The maximum tensile stress was then determined from the force applied using the above-mentioned theory.

It is well recognised in the art that the final strength properties of cured cementitious compositions are very dependent upon the curing and drying conditions which are employed. Clearly the optimum conditions in a given case will depend upon a number of factors, for example the nature of the hydraulic cement, the nature of the water-dispersible polymer and the relative proportions of these ingredients and the water.

It is to be understood that the homogeneous uncured cementitious compositions of the invention defined above are cured and dried under those conditions which are known by those skilled in the art to maximise the strength properties of the cured composition. In general these conditions will ensure that there is a constant temperature and a high humidity as the hydraulic cement is hydrated. Particularly suitable conditions of curing and drying which we have observed with simple mixtures of hydraulic cement, dispersing agent and water, are as follows: Curing for at least 3 days, and preferably at least 7 days, at a high relative humidity for example 100% relative humidity and at a temperature of at least 20° C. Drying: for at least 24 hours at a temperature of at least 50° C.

By the 'hydraulic cement' we mean those cements which comprise compounds of calcium, aluminium, silicon, oxygen and/or sulphur and which set and harden by reaction of these compounds with water. This definition will include those cements commonly classed as Portland cements, for example, ordinary Portland cement, rapid hardening and extra-rapid hardening Portland cements, sulphate-resisting Portland cement and other modified Portland cements; those cements commonly known as aluminous, high alumina cements, or calcium aluminate cements; and varieties of the foregoing cements containing small quantities of accelerants, retarders, air entraining agents.

We have found that there can be advantage in using a combination of cements, for example a principal cement and 0.2 – 20% by weight based on the principal cement of a co-cement. The principal and co-cement can comprise any of the hydraulic cements mentioned above.

Preferably the ratio of water to hydraulic cement is in the range 16 – 25 parts by weight of water to 100 parts by weight of hydraulic cement. Preferably also, the ratio of water-dispersible polymer is in the range 0.5 – 2.0 parts by weight of polymer to 100 parts by weight of hydraulic cement.

The relative proportions of hydraulic cement, water and water-dispersible polymer, and the specific water-dispersible polymer used, are selected in order to facilitate the homogenisation process discussed below and to yield an uncured cementitious composition which can be shaped under pressure, which is shape retaining and which on curing and drying provides a cementitious composition of high strength. Bearing in mind that the proportion of water is to be kept to a minimum in order to obtain a high modulus of rupture the nature and the proportion of the water-dispersible polymer which is used are largely determined by the rheology which is desired in the uncured cementitious composition.

Many polymers which are dispersible in water will increase the viscosity of water. In addition the rheological behaviour of these solutions is markedly different from that of water in that most will show non-Newtonian behaviour. These characteristics may be used to advantage in the processing of compositions which consist of suspensions, slurries or dispersions of solid particles in a low viscosity fluid medium such as water. The use of such polymers brings the advantage that the low shear viscosity of these compositions remains at such a high value that the compositions are not mobile, while under high shear the compositions can be caused to flow - in other words the compositions have pseudoplastic properties.

The way in which different polymers will affect the rheology of an uncured cementitious compositions is not always predictable from the rheology of the polymer solutions themselves. In order to determine those polymers which alter the rheology of an uncured composition in a suitable way, the following test may be applied:

A 100 g mass of the mixture of cement, water and chosen water-dispersible polymer is roughly formed into a thick disc and placed in the centre of a Perspex plate ⅜ thick. A similar Perspex plate of known weight is placed on top of the cement paste and spacers of ⅜ are placed between the plates which are then pushed together. The area covered by the composition is measured; if not 60 cm² ± 5% the test is restarted with the mass of paste adjusted appropriately.

The spacers are removed and a known load applied to the top plate (over the centre of the disc of material) in order to push the plates together. When the composition has stopped spreading, its area is measured and a further load is applied to the top surface. This process is repeated until the area covered by the cement paste is approximately three times the starting area.

The yield stress of the composition for each load in kg/cm² is calculated from the area covered and the weight applied. The log of yield stress is then plotted against the area in cm² covered by the sample. It has been found that a suitable material must have an initial yield stress of 0.05 kg/cm² and preferably 0.1 kg/cm². Where the plot of log yield stress against area is linear, the slope must be at least 0.00176 cm$^{-2}$, and where the plot is not linear it should be concave towards the X axis. If the slope is greater than 0.1 cm$^{-2}$ or the plot is concave upwards, it will be found that in an extrusion process, for example, the composition will become more difficult to extrude with increase of applied pressure.

A particularly suitable class of water-dispersible polymer is further defined by a test in which is determined the rate of heat evolution during the reaction of a defined mixture of a given hydraulic cement, water and the polymer under test. A significant delay in reaching the maximum rate of heat evolution as compared with the time to reach maximum heat evolution of a similar mixture free from the polymer, is indicative of a water-dispersible polymer particularly suitable in the present invention. By a significant delay we mean any time between 0.5 hrs (30 minutes) and about 20 hrs; polymers which delay the maximum rate of heat evolution by more than about 20 hrs are unsuitable water-dispersible polymers in the invention.

The procedure used in the test is as follows:

The polymer to be examined is used to prepare an aqueous solution of concentration 1 - 10% by weight. A small quantity (10g) of the cement (or mixture of cements) is weighed out and to this a weighed quantity of the polymer solution is added such that the w/c ratio is 0.3/1. These components are then rapidly and thoroughly mixed to give a paste. Approximately 0.5 g of this paste is put in a small aluminium pan with a polythene stopper and placed in a Perkin-Elmer Differential Scanning Calorimeter. The temperature is maintained constant at 57° C unless the polymer is known to undergo a change at this temperature, in which case the temperature is maintained at 30° C. As the cement hydration reactions proceed heat is evolved and the rate of heat evolution is recorded on a chart recorder. The time taken to reach maximum rate of heat evolution can then be compared with the time taken by a cement/water mix in the absence of polymer. (W/C = water/cement)

Particularly suitable water dispersible polymers in this invention are the non-ionic alkyl or hydroxy alkyl cellulose ethers and non-ionic polymers and copolymers of acrylamide and methacrylamide.

It is essential to the production of the high strength cementitious compositions of this invention that the uncured cementitious compositions from which they are produced by curing under appropriate conditions are homogeneous. In using the term 'homogeneous' we mean that the ingredients of the composition - essentially the ingredients hydraulic cement, water-dispersible polymer and water, but also including any other ingredients which may be desired and which are further discussed below - have been subjected to such processes of dispersion and homogenisation that they are regularly dispersed throughout the composition. Particularly suitable processes for producing such a condition in the uncured composition comprise extrusion and calendering. Preferably the ingredients are first blended and subjected to a first stage of high shear mixing and deaeration processes, whereby gross inhomogeneity is eliminated, to produce a dough. This material is then subjected to a second stage of compaction and dispersion in order to obtain the homogenisation required in the uncured cementitious composition. Preferably this second stage comprises extrusion or calendering processes but other suitable processes include press moulding, injection moulding and expression rolling. The ingredients of this invention may, however, be subjected to any suitable conditions which produce a homogeneous composition.

The homogeneous uncured cementitious composition of this invention may be shaped in the form of articles, and thereafter cured and dried to yield the finished articles. The shaping operation may occur during or immediately after homogenisation, for example by extrusion or calendering.

The compositions of this invention may comprise fibre. Not more than 1% be weight of an inorganic mineral fibre, such as asbestos, is used and preferably the composition is free from this particular fibre.

Preferably the fibre is present in the composition in a proportion which is not greater than the critical volume fraction of the fibre with respect to the composition. The impact strength of the composition may be thus improved whilst the stress-strain relationship remains substantially unchanged. Suitable fibres which improve the impact strength include nylon and polypropylene.

It may be desired to include in the present compositions a proportion of fibre which has a high tensile strength and which further increases the modulus of rupture beyond the already high limit of proportionality of the stress-strain plot.

The present compositions may also comprise filler, pigment and any other suitable ingredient of cementitious compositions whenever appropriate.

The invention is illustrated by the following Examples in which parts and percentages are by weight unless otherwise stated.

EXAMPLE 1

This Example illustrates the importance of a suitable homogenisation process in obtaining an homogeneous uncured cementitious composition according to the invention, which, on being cured and dried, will yield a cementitious composition of high strength. A blend of hydraulic cement, water and water-dispersible polymer was subjected to two stages of homogenisation and samples from each stage were tested for strength properties. Only after the second stage (i.e. after extrusion) was there obtained an uncured composition which could be cured and dried to yield a cured cementitious composition of high strength according to the invention.

| A blend comprising: | |
|---|---|
| Ordinary Portland cement | 100 parts |
| Calcium aluminate cement (commercially available as "Secar 250" from Lafarge Ltd) | 5 parts |
| Hydroxypropylmethyl cellulose (commercially available as "Celacol HPM 15000 DS") | 1.84 parts |
| Water | 21.16 parts |

(the hydroxypropyl methyl cellulose was dispersed in the water before being added to the cement; the hydroxypropyl methyl cellulose was a water-dispersible polymer which satisfied the rheology test and the "rate of heat evolution test" described in the specification) was well mixed over 10 minutes to form a dough in a planetary motion mixer fitted with a dough hook. The water-dispersible polymer satisfied the tests defined by the present invention; the dough contained 20.1 parts water/100 parts cement and 1.75 parts water-dispersible polymer/100 parts cement.

Half of this dough was retained and the remainder was loaded into a 3 inch ram extruder; the dough was deaerated under a vacuum of 29–30 inches mercury for 3 minutes, and then extruded through a tubular die of $\frac{1}{2}$ inch diameter and 6 inch length under pressure of 13.8 MN/m$^2$. The rod produced by this method was cured for 3 days in an atmosphere of 100% relative humidity at 20° C and then dried for 1 day at 50° C. Samples (A) from the rod were tested for limit of proportionality, modulus of rupture and elastic modulus (by the 6 inch span, 3-point bend test using a tensometer as indicated in the specification), and for impact strength (using the Charpy test). The density was also determined. The original half of the dough was tamped into a mould, cured and dried under the same conditions as the extruded rod, and samples (B) of the product from the mould were tested as above.

The test results were as follows:

| Sample | Limit of Proportionality (MNm$^{-2}$) | Modulus of Rupture (MNm$^{-2}$) | Modulus (GNm$^{-2}$) | Impact strength (KJm$^{-2}$) | Density (gcm$^{-3}$) |
|---|---|---|---|---|---|
| A | 31 | 31 | 22 | 1.6 | 2.0 |
| B | 7 | 7 | 15 | 1 | 1.8 |

EXAMPLE 2

This Example illustrates that both the modulus of rupture and the limit of proportionality of the essential cementitious 'matrix' of a cured composition according to this invention remain high, substantially constant and substantially the same even when there is present in the 'matrix' an increasing proportion of a synthetic fibre. The maximum proportion of fibre added, even at 6% by weight, was still insufficient to increase the modulus of rupture of the composition. But this fibre was useful in that it increased the impact strength of the cured composition without requiring any increase in the amount of water used and thus any loss in strength of the cured 'matrix'.

The ingredients used were those described in Example 1. A dough similar to that obtained in Example 1 by mixing the ingredients in the planetary motion mixer was divided into eight portions and a proportion of 20 denier chopped nylon fibre of 10mm stable length corresponding to one of the fibre contents indicated in the accompanying table was added to each of the eight portions. Mixing of each portion was continued in a planetary mixer for 10 minutes to produce eight fibre-modified doughs. Each dough was loaded into a 3 inch ram extruder, the dough was deaerated under a vacuum of 29–30 inches of mercury for 3 minutes and then extruded through a tubular die of $\frac{1}{2}$ inch diameter and 6 inch length under a pressure of 13.8 MN/m$^2$/square inch. The rod produced was cured for 3 days in an atmosphere of 100% relative humidity at 20° C and then dried for 1 day at 50° C. Samples from the rods were tested for limit of proportionality, modulus of rupture, elastic modulus (by the 6 inch span, 3-point bend test using a tensometer) and for impact strength (using the Charpy test). The density was also determined.

The test results were as follows:

| Fibre Content (Pts by wt/ 100 pts cement) | Limit of Proportionality (MN m$^{-2}$) | Modulus of Rupture (MN m$^{-2}$) | Modulus (GN m$^{-2}$) | Impact strength (KJ m$^{-2}$) | Density (g cm$^{-3}$) |
|---|---|---|---|---|---|
| (0) | (30) | (30) | (18) | (2) | (1.95) |
| 0.25 | 28 | 28 | 20 | 3 | 1.9 |
| 0.5 | 32 | 32 | 21 | 4 | 1.9 |
| 1 | 33 | 33 | 19 | 6 | 2.0 |
| 2 | 34 | 34 | 22 | 9 | 2.0 |
| 3 | 32 | 32 | 20 | 13 | 2.0 |
| 4 | 34 | 34 | 19 | 16 | 2.0 |
| 5 | 31 | 31 | 18 | 20 | 1.9 |
| 6 | 33 | 33 | 19 | 19 | 1.9 |

EXAMPLE 3

In this Example it is shown that when certain mixtures of cement (i.e. a principal cement and a co-cement) are used in the preparation of homogeneous uncured cementitious compositions according to the invention, the cured and dried compositions obtained from them show an increase in the modulus of rupture as the proportion of co-cement is increased.

The water-dispersible polymer used was hydroxypropyl methyl cellulose (HPMC). The homogenisation, curing, drying and testing of the products was carried out as described in Example 1 unless otherwise stated.

The test results obtained were as follows:

| Principal cement / parts | Co-cement / parts | HPMC parts/ 100 parts principal cement | Water parts/ 100 parts principal cement | Nylon fibre parts/100 parts principal cement | Modulus of Rupture (=Limit of proportionality) (MN m$^{-2}$) |
| --- | --- | --- | --- | --- | --- |
| Rapid Hardening Portland Cement / 100 | — — | 1.68 | 19.32 | 0.5 | 26 |
| RHPC 100 | "*Secar 250"/ 3 | 1.68 | 19.32 | 0.5 | 25 |
| RHPC 100 | "*Secar 250"/ 4 | 1.68 | 19.32 | 0.5 | 27 |
| RHPC 100 | "*Secar 250"/ 5 | 1.68 | 19.32 | 0.5 | 26 |
| RHPC 100 | "*Secar 250"/ 6 | 1.68 | 19.32 | 0.5 | 29 |
| RHPC 100 | "*Secar 250"/ 7 | 1.68 | 19.32 | 0.5 | 35 |
| RHPC 100 | "*Secar 250"/ 8 | 1.68 | 19.32 | 0.5 | 34 |
| Ordinary Portland Cement / 100 | — — | 0.92 | 22.08 | 0.5 | 20 |
| OPC 100 | "**Ciment Fondu"/ 2.5 | 0.92 | 22.08 | 0.5 | 28 |
| OPC 100 | "**Ciment Fondu"/ 5 | 0.92 | 22.08 | 0.5 | 32 |
| Rapid Hardening P Cement 100 | "Ciment Fondu"/ 5 | 1.68 | 19.32 | 0.5 | 29.5 |
| RHPC 100 | "Ciment Fondu"/ 10 | 1.68 | 19.32 | 0.5 | 30.5 |
| "Ciment Fondu" 100 | | 1.68 | 19.32 | 0.5 | 30.8+ |
| "Ciment Fondu" 100 | RHPC 5 | 1.68 | 19.32 | 0.5 | 31.4+ |

*Calcium Aluminate cement
**High Alumina cement
+Cured 28 days 100% RH; dried 1 week 20° C

EXAMPLE 4

This Example illustrates the beneficial effect of an increasing proportion of water-dispersible polymer on the modulus of rupture of cured cementitious compositions according to the invention, the proportion of water remaining substantially constant.

(a) A blend of the following ingredients:
| | |
| --- | --- |
| Rapid hardening Portland cement | 100 parts |
| 'Ciment Fondu' | 5 parts |
| Hydroxypropyl methyl cellulose (commercially available as 'Celacol 15000') | x parts (according to the table) |
| Chopped nylon fibre (20 denier, 10 mm staple length) | 0.5 parts |
| Water (the hydroxypropyl methyl cellulose was first dispersed in the water) | y parts (according to the table) | was homogenised by the two-stage process described in Example 1, the extruded rod being cured for 7 days at 100% relative humidity at 20° C and then dried for 24 hours at 70° C. the following test results were obtained:

| Water (parts y) | Water-dispersible polymer (parts) /100 parts total cement x | Modulus of Rupture MN m$^{-2}$ | Density gcm$^{-3}$ |
| --- | --- | --- | --- |
| 21.9 | .105 | 0.11 | 22.1 | 2.12 |
| 21.6 | 0.40 | 0.42 | 21.8 | 2.40 |
| 19.95 | 1.00 | 1.05 | 27.9 | 2.24 |
| 19.32 | 1.60 | 1.68 | 31.2 | 2.13 |
| 19.38 | 2.51 | 2.64 | 32.2 | 2.23 |

(b) A blend of the following ingredients:
| | |
| --- | --- |
| Rapid hardening Portland cement | 105 parts |
| Hydroxypropyl methyl cellulose "Celacol 15000" | x parts (according to the table) |
| Chopped nylon fibre (20 denier, 10 mm staple length) | 0.5 parts |
| Water (the hyroxypropyl methyl cellulose was first dispersed in the water) | y parts (according to the table) | was homogenised, cured, dried and tested in a manner similar to that described in Example 4 (a).

The following test results were obtained:

| Water (parts) Y | Water-dispersible polymer (parts) /100 parts (=x) cement | Modulus of Rupture MN m$^{-2}$ | Density gcm$^{-3}$ |
| --- | --- | --- | --- |
| 21.9 | 0.105 | 18.7 | 2.16 |
| 21.6 | 0.40 | 20.9 | 2.30 |
| 19.95 | 1.00 | 22.2 | 2.04 |
| 19.32 | 1.60 | 21.2 | 2.13 |
| 19.38 | 2.51 | 22.9 | 2.18 |

EXAMPLE 5

This Example illustrates the effect of water concentration on the modulus of rupture of cementitious compositions according to the invention containing a fixed concentration of water-dispersible polymer. Only when the water concentration was at 28 parts or less/100 parts of cement was the strength of the cured composition able to exceed 15MN m$^{-2}$.

| The following ingredients: | |
|---|---|
| Rapid Hardening Portland cement | 100 parts |
| Hydroxypropyl methyl cellulose ("Celacol 15000") | 1.6 parts |
| Water | x parts (according to the table) | were homogenised by the two-stage process described in Example 1, the extruded rod being cured for 7 days at 20° C and 100% relative humidity and dried for 7 days at 20° C.

The following results were obtained:

| Parts water (x)/ 100 parts cement | Modulus of Rupture MN m$^{-2}$ | Density gcm$^{-3}$ |
|---|---|---|
| 33.4 | 11.3 | 1.55 |
| 28.4 | 15.4 | 1.67 |
| 23.4 | 18.4 | 1.85 |
| 18.4 | 30.1 | 2.12 |

EXAMPLE 6

This Example illustrates the effect on the modulus of rupture of varying the curing and drying conditions to which an uncured cementitious composition according to this invention can be exposed. Whereas an uncured composition according to the invention will always yield a cured and dried composition having a modulus of rupture greater than 15 MN m$^{-2}$ when the conditions have been selected in accordance with established practice, it is shown that there are particular preferred curing and drying conditions for selected compositions.

(a) The following ingredients:

| Rapid Hardening Portland cement | 105 parts |
|---|---|
| Hydroxypropyl methyl cellulose ("Celacol HPM 15000") | 1.6 parts |
| Chopped nylon fibre (20 denier 10mm staple length) | 0.5 parts |
| Water (the hydroxypropyl methyl cellulose was first dispersed in the water) | 18.4 parts | were mixed together in a Werner-Pfleiderer 'pug' mixer. The resulting dough was transferred to the barrel of a ram extruder and, after evacuation of the trapped air, was extruded from a die 0.5 inches in diameter. Lengths of material were extruded into plastic tubes and cured in different environments for different lengths of time. The samples were removed from the tubes and finally dried off at 20° C and 55% relative humidity.

The samples were then broken in a three-point bend test to determine the modulus of rupture. The modulus of rupture values (MNm$^{-2}$) are given in the following table:

| Cure time : | 7 days | 28 days | |
|---|---|---|---|
| Environment | 100% RH at 20° C | 100% RH at 20° C | 55% RH at 20° C |
| Dry off condns — No dry off | 9.8 | 20.2 | 16.1 |
| 24 hrs at 20° C | 22.9 | 16.2 | 22.5 |
| 1 week at 20° C | 28.8 | 27.5 | 28.9 | b. The effect of allowing the composition to cure without being encased in a plastic tube is shown as follows. The composition described in (a) was extruded and cut into short lengths which were cured at 100% RH at 20° C for 7 days. The samples were then dried off at 20° C for different times and subjected to the 3-point bend test. The following table compares the modulus of rupture of samples contained in tubes with samples not in tubes.

| Final dry off conditions | Modulus of Rupture (MN m$^{-2}$) | |
|---|---|---|
| | In tubes | Not in tubes |
| No dry off | 9.8 | 24.2 |
| 24 hrs at 20° C | 22.9 | 27.5 |
| 7 days at 20° C | 28.8 | 34.7 | c. In this experiment it is shown that a high strength can be achieved more rapidly when the final dry-off is carried out at 70° C.

| The following ingredients: | |
|---|---|
| Rapid Hardening Portland cement | 100 parts |
| 'Ciment Fondu' | 5 parts |
| Hydroxypropyl methyl cellulose ("Celacol HPM 15000") | 1.6 parts |
| Chopped nylon fibre (as above) | 0.5 parts |
| Water (the hydroxypropyl methyl cellulose was first dispersed in the water) | 18.4 parts | were mixed as described in (a). The extruded material was cut into lengths and cured at 100% RH at 20° C for 7 days. The samples were then dried at 20° C or 70° C as described in the following table and subjected to a 3-point bend test. The modulus of rupture of the samples was as follows:

| Dry off time | Modulus of Rupture (MN m$^{-2}$) when dried at | |
|---|---|---|
| | 20° C | 70° C |
| No dry off | 23.9 | — |
| 6 hours | — | 17.3 |
| 24 hours | 25.6 | 31.3 |
| 1 week | 31.8 | 32.1 | d. The effect of different curing environments and different lengths of cure time is illustrated as follows:

| The following ingredients: | Composition 1 | Composition 2 |
|---|---|---|
| Rapid Hardening Portland cement | 100 | 100 |
| 'Ciment Fondu' | — | 5 |
| Hydroxypropyl methyl cellulose ("Celacol HPM 15000") | 1.68 | 1.68 |
| Chopped nylon fibre | 0.5 | 0.5 |
| Water (the hydroxypropyl methyl cellulose was first dispersed in the water) | 19.32 | 19.32 | were mixed and extruded as in (b) and (c) above.

After curing, all samples were dried for 24 hours at 70° C and subjected to the 3-point bend test to obtain the modulus to rupture as follows:

| Cure conditions | Time | Modulus of Rupture (MN m$^{-2}$) | |
|---|---|---|---|
| | | Comp. 1 | Comp. 2 |
| Air, 50% RH, 20° C | 7 days | 19.7 | 22.0 |
| | 28 days | 18.0 | 19.0 |
| 100% RH, 20° C | 7 | 20.5 | 33.2 |
| | 28 | 29.1 | 29.4 |

-continued

| Cure conditions | Time | Modules of Rupture (MN m⁻²) | |
|---|---|---|---|
| | | Comp. 1 | Comp. 2 |
| Water (static), 20° C | 7 | 16.4 | 22.6 |
| | 28 | 21.6 | 25.4 |
| Water (running) | 7 | 21.5 | 31.4 |
| | 28 | 20.5 | 27.5 |
| Wet sand | 7 | 22.7 | 25.7 |
| | 28 | 19.9 | 24.1 | e. The interaction of cure temperature and composition is further demonstrated in the following table:

| Temp. | Time | Modulus of Rupture (MN/m⁻²) | |
|---|---|---|---|
| | | Comp. 1 | Comp. 2 |
| 100% RH 10° C | 7 days | 18.9 | 27.6 |
| 100% RH 20° C | 7 | 26.0 | 29.5 |
| 100% RH 30° C | 7 | 28.3 | 30.0 |

EXAMPLE 7

This Example illustrates the selection of a group of water-dispersible polymers, which are particularly suitable in the present invention, by a test procedure which is hereinbefore described. The test procedure determines any significant retardation in the maximum heat evolution during hydration of the cement in the presence of the polymer. Any water-dispersible polymer which displays significant but not excessive (i.e. between 0.5 and 20 hours) retardation is particularly useful in the invention but the invention is in no way limited to the use of these particular polymers nor to the specific polymers which are illustrated in the following table:

| Water-dispersible Polymer | Pts Polymer/ 100 pts cement by weight | Pts water/ 100 pts cement by weight | Cements RHPC | C.Fondu | Retardation (hrs) | MOR (MN/m²) |
|---|---|---|---|---|---|---|
| Hydroxy propyl methyl cellulose ("Celacol 15000") | 1.68 | 18.4 | 105 | — | 2.25 | 31.9 |
| | 1.68 | 18.4 | 100 | 5 | 1.3 | 31.5 |
| Methyl cellulose ether (Sample A) | 1.64 | 18.0 | 105 | 0 | 3.75 | 28.7 |
| | 1.64 | 18.0 | 95 | 10 | 1.9 | 31.5 |
| Methyl cellulose ether (sample B) | 1.64 | 18.0 | 105 | 0 | 5.75 | 22.7 |
| | 1.64 | 18.0 | 100 | 5 | 2.8 | 28.8 |
| Ethyl hydroxy ethyl cellulose ether ("Modocoll") EK 2000 PQ | 1.08 | 18.8 | 105 | 0 | 3.0 | 21.2 |
| | 1.08 | 18.8 | 100 | 5 | 2.8 | 22.5 |
| Poly(ethylene oxide) ("Polyox" Coagulant) | 2.10 | 18.0 | 100 | 5 | 0 | 19.4 |
| | 2.10 | 18.0 | 105 | 0 | 0 | 17.5 |
| Polyethylene oxide ("Polyox" WSR 301) | 2.10 | 18.0 | 105 | 0 | 0 | 19.3 |
| | 2.10 | 18.0 | 100 | 5 | 0 | 15.7 |
| Polyvinyl pyrollidone | 1.68 | 18.4 | 100 | 0 | 0 | 20.3 |
| | 1.68 | 18.4 | 105 | 5 | 0 | 20.0 |
| Polyacrylamide ("cyanamer P250") | 2.1 | 18.0 | 100 | 0 | 18 | 22.6 |
| | 2.1 | 18.0 | 105 | 5 | 14 | 27.8 |
| Gelatin 373 | 2.1 | 18.0 | 100 | 5 | 0.4 | 15.3 |
| Polyethylene Imine | 2.4 | 20.5 | 105 | 0 | 0.25 | 17.5 |
| Hydroxylpropyl Starch (Sample A) | 2.6 | 22.3 | 105 | 0 | >24 hrs | 10.6 |
| | 2.6 | 22.3 | 100 | 5 | | 10.3 |
| Hydroxylpropyl Starch (Sample B) | 2.1 | 18.0 | 105 | 0 | >24 hrs | 10.7 |
| | 2.2 | 18.9 | 100 | 5 | | 8.6 |

EXAMPLE 8

This Example illustrates the effect of a fibre having a high modulus of elasticity, i.e. alkali resistant glass fibre (commercially available from Pilkington Brothers as "Cemfil") on the strength properties of a cured cementitious composition according to the invention. A simple, cured composition of cement, water-dispersible polymer and water according to the invention and free from fibre has a surprisingly high limit of proportionality, which is substantially coincident with the modulus of rupture, and the modulus of rupture is for the most part unaffected by fiber at levels less than the critical volume. At levels of glass fibre greater than the critical volume of that fibre the limit of proportionality remains constant while the modulus of rupture is increased.

| The following ingredients: | |
|---|---|
| Rapid Hardening Portland cement | 100 parts |
| High Alumina cement ("Secar 250") | 5 parts |
| Hydroxypropyl methyl cellulose | 1.84–2.08 parts |
| Water | 21.16–23.92 parts |
| Glass fibre ("Cemfil") 20 micron 12 mm staple length | x parts (see table) | were mixed in a Hobart dough mixer and then extruded through a ½ inch diameter die to produce a homogeneous composition according to the die. The extrudate was cured for 3 days at 50% relative humidity, dried for 24 hours at 50° C; tested in the 3-point bend test; tested for impact strength; the density determined.

The following results were obtained:

| Parts by weight of glass fibre (x) | Limit of proportionality (MN m⁻²) | Modulus of Rupture (MN m⁻²) | Modulus (GN m⁻²) | Impact strength (KJm⁻²) | Density (gcm⁻³) |
|---|---|---|---|---|---|
| 0.00 | 31 | 31 | 22 | 1 | 2.00 |
| 0.25 | 30 | 30 | 21 | 1 | 2.00 |
| 0.50 | 31 | 31 | 19 | 1 | 1.85 |
| 1.00 | 32 | 32 | 17 | 1 | 1.95 |
| 2.00 | 30 | 30 | 19 | 2 | 1.95 |
| 4.00 | 35 | 36 | 21 | 3 | 2.00 |
| 6.00 | 32 | 38 | 20 | 5 | 2.00 |
| 8.00 | 34 | 46 | 21 | 5 | 2.00 |
| 10.00 | 33 | 50 | 22 | 6 | 1.95 |
| 12.00 | 33 | 56 | 26 | 8 | 2.15 |
| 14.00 | 35 | 52 | 23 | 9 | 2.10 |

EXAMPLE 9

This Example illustrates the preparation of a homogeneous uncured cementitious composition according to the invention wherein the homogenisation of the composition includes a calendering stage.

| The following ingredients: | |
| --- | --- |
| Ordinary Portland cement | 100 parts |
| 'Ciment Fondu' | 5 parts |
| Hydroxypropyl methyl cellulose ("Celacol 15000 DS") | 1.92 parts |
| Water | 22.08 parts |
| Nylon fibre (20 denier, 10mm staple) | 1.00 parts | were mixed and formed into a dough by mixing for 3 minutes in a planetary mixer and for 1 minute in a Banbury compounding mixer. The dough was then worked on a 2-roll calendering mill having highly polished rollers at a surface temperature of 25° C. The product was cured at 50% RH at a temperature of 20C for days and then dried. The cured dried product had a modulus of rupture of 26 MN/m$^2$; an elastic modulus of 18 GN/m$^2$ and an impact strength of 3.34 KJ/m$^2$.

EXAMPLE 10.

The following Example illustrates the effect of incorporating small quantities (less than 1% by weight) of natural mineral fibers. It is found that when the volume fraction of natural mineral fiber is similar to or less than that already exemplified for synthetic ogranic fiber, the rheology of the composition is altered in a disadvantageous direction in comparison with the rheology of the nyloncontaining compositions. In order to obtain rheological properties which permit mixing and homogenization (as described), the water content of the composition must be increased slightly. Nevertheless, the modulus of rupture is not significantly altered.

The following ingredients were weighed into the bowl of a planetary motion mixer equipped with a dough hook.

| Rapid hardening Portland cement | 100 pts. |
| --- | --- |
| 'Cement Fondu' | 5 pts |
| Hydroxypropyl methyl cellulose | 1.6 pts |
| Water | 19.9 pts |
| Nylon fibre (20 denier, 10 mm staple length) | 0.5 pts |

The materials were mixed into a dough and then mixed for a further five minutes to give a coherent stiff mass. This material was then placed in a ram extruder and extruded at a pressure of 1700 p.s.i. through a 14 mm diameter die to give rods of material which were hydrated for 7 days at 100% RH and then dried for 24 hours at 70° C.

In another experiment the same ingredients, except for the nylon fibre were changed to the mixing bowl. A volume of asbestos fibre one-third lower than the volume of nylon fibre was then added (with due care for the hazards attendant upon the use of asbestos). The materials mixed into an extremely stiff dough with a very high cohesive strength. This dough could not be extruded even at a pressure of 2300 p.s.i.

In a further experiment the same ingredients were charged to the bowl except for the nylon fibre. The same volume of asbestos fibre as before was added and a further 0.5 parts of water. The materials again mixed to an extremely stiff dough with very high cohesive strength. When charged to the ram extruder the materials extruded very slowly at 2300 p.s.i. to give rods which were then treated as in the first experiment.

| The proportions of the final mix by weight were: | |
| --- | --- |
| Rapid hardening Portland cement | 100 pts |
| 'Ciment Fondu' | 5 pts |
| Hydroxypropyl methyl ether | 1.6 pts |
| Water | 20.4 pts |
| Asbestos (Canadian Chrysotile) | 1 pt. |

The samples obtained were tested in three-point bending test and gave the following results:

| | Nylon | Asbestos |
| --- | --- | --- |
| Modulus of Rupture | 34 MN/m$^2$ | 34 MN/m$^2$ |

What we claim is:

1. A homogeneous uncured cementitious composition which comprises the ingredients:
   a. a hydraulic cement selected from the group consisting of cements which comprise compounds of calcium, aluminum, silicon, oxygen and/or sulfur which set and harden by reaction with water,
   b. water, and
   c. a water-dispersible polymer, wherein
      i. the ratio of water to hydraulic cement is in the range 15 - 28 parts by weight of water to 100 parts by weight of hydraulic cement;
      ii. the ratio of water-dispersible polymer to hydraulic cement is in the range 0.1 - 3.0 parts by weight of water dispersible polymer to 100 parts by weight of hydraulic cement; and
      iii. the water-dispersible polymer is selected, with reference to the hydraulic cement and to the selected proportions of polymer and water, for its suitability to facilitate homogenization and to yield on homogenization an uncured composition which can be shaped under pressure and which is shape retaining, and wherein the ingredients (a), (b) and (c) have been subjected to a homogenization process of dispersion and homogenization so that they are regularly dispersed throughout the composition; such that on curing and drying, the homogeneous uncured composition yields a cured and dried cementitious composition having a modulus of rupture greater than 15 MN/m$^2$.

2. A homogeneous uncured cementitious composition according to claim 1 wherein the water-dispersible polymer is further selected with reference to the hydraulic cement by a test which demonstrates a significant prolongation of the time which is required by a mixture of the water-dispersible polymer, hydraulic cement, and water in defined weight proportions to reach a maximum rate of heat evolution compared with the time which is required to reach a maximum rate of heat evolution by a mixture of hydraulic cement and water alone in the same weight proportions.

3. A homogeneous uncured cementitious composition according to claim 1 which on curing and drying yields a cured and dried cementitious composition having a modulus of rupture of greater than 20 MN/m$^{-2}$.

4. A homogeneous uncured cementitious composition according to claim 1 which on curing and drying yields a cured and dried cementitious composition having a modulus of rupture of greater than 30 MN/m$^{-2}$.

5. A homogeneous uncured cementitious composition according to claim 1 wherein the hydraulic cement comprises a Portland cement or a high alumina cement.

6. A homogeneous uncured cementitious composition according to claim 1 wherein the hydraulic cement comprises a mixture of a principal cement and 0.2–20% by weight based on the principal cement of a co-cement.

7. A homogeneous uncured cementitious composition according to claim 1 wherein the ratio of water to hydraulic cement is in the range 16 – 25 parts by weight of water to 100 parts by weight of hydraulic cement.

8. A homogeneous uncured cementitious composition according to claim 1 wherein the ratio of water-dispersible polymer to hydraulic cement is in the range 0.5 – 2.0 parts by weight of polymer to 100 parts by weight of hydraulic cement.

9. A homogeneous uncured cementitious composition according to claim 1 wherein the water-dispersible polymer is selected from non-ionic alkyl or hydroxy alkyl cellulose ethers and non-ionic polymers and copolymers of acrylamide and methacrylamide.

10. A homogeneous uncured cementitious composition according to claim 1 wherein the ingredients are subjected to a homogenisation process which comprises high shear mixing.

11. A homogeneous uncured cementitious composition according to claim 1 wherein the ingredients are subjected to a homogenisation process which comprises extrusion.

12. A homogeneous uncured cementitious composition according to claim 1 wherein the ingredients are subjected to a homogenisation process which comprises calendering.

13. A homogeneous uncured cementitious composition according to claim 1 which comprises a fibre other than an inorganic mineral fibre.

14. A homogeneous uncured cementitious composition according to claim 13 wherein the fibre is of a natural or synthetic organic polymer.

15. A homogeneous uncured cementitious composition according to claim 14 wherein the fibre is nylon fibre or polypropylene fibre.

16. A homogeneous uncured cementitious composition according to claim 13 wherein the fibre is a synthetic inorganic fibre.

17. A homogeneous uncured cementitious composition according to claim 16 wherein the fibre is glass fibre.

18. A homogeneous uncured cementitious composition according to claim 13 wherein the fibre is present in a proportion which is not greater than the critical volume of that fibre with respect to the cured composition i.e. it does not increase the modulus of rupture of the cured composition beyond the limit of proportionality of the fibre-free cured composition.

19. A homogeneous uncured cementitious composition according to claim 13 wherein the fibre is present in a proportion which is greater than the critical volume of that fibre with respect to the cured composition i.e. it increases the modulus of rupture of the cured composition beyond the limit of proportionality of the fibre-free cured composition.

20. A method of producing a homogeneous uncured cementitious composition, which when cured and dried yields a cured cementitious composition having a modulus of rupture greater than 15 $MN/m^{-2}$, which comprises subjecting to a homogenization process of dispersion and homogenization ingredients (a), (b) and (c) as defined in claim 1 so that they are regularly dispersed throughout the composition.

21. A method according to claim 20 wherein the homogenisation process comprises a mixing process followed by an extrusion process.

22. A method according to claim 20 wherein the homogenisation process comprises a mixing process followed by a calendering process.

23. A method according to claim 20 wherein the uncured composition is shaped.

24. A method of producing a cured and dried cementitious composition having a modulus of rupture greater than 15 $MN/m^{-2}$ which comprises curing and drying a homogeneous uncured cementitious composition as claimed in claim 1.

25. A method according to claim 24 wherein the uncured cementitious composition is cured for at about least 3 days, and preferably at least 7 days, at 100% relative humidity at a temperature of at least 20° C and is thereafter dried for at least 24 hours at a temperature of at least 50° C.

26. A cured and dried cementitious composition comprising cured hydraulic cement and a water-dispersible polymer which has a modulus of rupture greater than 15 $MN/m^2$.

27. A cured and dried cementitious composition according to claim 26 which has a modulus of rupture greater than 20 $MN/m^2$.

28. A cured and dried cementitious composition according to claim 27 which has a modulus of rupture greater than 30 $MN/m^{-2}$.

29. A cured and dried cementitious composition according to claim 26 which comprises a fibrous material in a proportion not greater than the critical volume of that fibre with respect to the fibre-free composition.

30. A cured and dried cementitious composition according to claim 26 which comprises a fibrous material in a proportion greater than the critical volume of that fibre with respect to the fibre-free composition.

31. A cured and dried cementitious composition prepared by curing and drying a homogeneous uncured cementitious composition according to claim 1.

32. A shaped article which comprises a cured and dried cementitious composition according to claim 31.

* * * * *